United States Patent
Husain

(10) Patent No.: US 12,241,771 B2
(45) Date of Patent: Mar. 4, 2025

(54) ENERGY CORRELATION FLOW METERS

(71) Applicant: Bell Technologies, LLC, Katy, TX (US)

(72) Inventor: Zaki Din Husain, Katy, TX (US)

(73) Assignee: BELL TECHNOLOGIES, LLC, Katy, TX (US)

( * ) Notice: Subject to any disclaimer, the term of this patent is extended or adjusted under 35 U.S.C. 154(b) by 214 days.

(21) Appl. No.: 17/967,514

(22) Filed: Oct. 17, 2022

(65) Prior Publication Data

US 2023/0119021 A1    Apr. 20, 2023

Related U.S. Application Data

(60) Provisional application No. 63/257,232, filed on Oct. 19, 2021.

(51) Int. Cl.
*G01F 25/10* (2022.01)
*G01F 1/36* (2006.01)
*G01F 15/06* (2022.01)

(52) U.S. Cl.
CPC ............. *G01F 25/10* (2022.01); *G01F 1/36* (2013.01); *G01F 15/06* (2013.01)

(58) Field of Classification Search
CPC . G01F 25/10; G01F 1/36; G01F 15/06; G01F 1/44; G01F 1/363; G01F 25/13; G01F 25/15
See application file for complete search history.

(56) References Cited

U.S. PATENT DOCUMENTS

| | | | |
|---|---|---|---|
| 5,458,006 A * | 10/1995 | Roqueta | B09B 1/006 73/861.61 |
| 7,357,040 B2 | 4/2008 | Bell | |
| 9,291,486 B2 | 3/2016 | Singfield | |
| 10,054,472 B1 | 8/2018 | Bell | |
| 10,444,044 B2 | 10/2019 | Bell et al. | |
| 10,794,741 B2 | 10/2020 | Bell et al. | |
| 2002/0183941 A1* | 12/2002 | Cunningham | G01F 1/8431 702/45 |
| 2011/0006133 A1* | 1/2011 | Lemmer | G01F 1/44 239/533.1 |
| 2014/0109686 A1* | 4/2014 | Ramsay | G01F 25/00 73/861.18 |

(Continued)

OTHER PUBLICATIONS

Z.D. Husain et al., "The Effect of Orifice Eccentricity in a Small Line Size," International Conference on the Metering of Natural Gas and Liquified Hydrocarbon Gases, Feb. 1-2, 1984, 24 pages.

(Continued)

*Primary Examiner* — Peter J Macchiarolo
*Assistant Examiner* — John M Royston
(74) *Attorney, Agent, or Firm* — Shawn Hunter

(57) ABSTRACT

A method for calibrating flow meters measuring fluid passing through a pipe wherein fluid pressures are detected and used to determine a volume or mass flow rate using an energy correlation calculation. The energy correlation calculation equates a change in potential energy for the flowing fluid with a change in kinetic energy for the flowing fluid. The energy correlation method of calculating flow rate offers lower measurement uncertainty than calculating flow by the Reynolds number versus discharge coefficient method.

13 Claims, 4 Drawing Sheets

(56) References Cited

U.S. PATENT DOCUMENTS

2014/0137663 A1* 5/2014 Evans ................ G01F 15/005
73/861.61
2021/0102831 A1* 4/2021 Ahmad ................ G01F 25/10

OTHER PUBLICATIONS

Z.D. Husain, "Effects of Flow-Induced Disturbances on the Output of Industrial Pressure Transducers," Gas Processors Association Technical Publication TP-13, Oct. 21, 1983, 13 pages.

* cited by examiner

ENERGY CORRELATION FLOW METERS

BACKGROUND OF THE INVENTION

1. Field of the Invention

This invention relates generally to devices and methods for calculating flow rate of fluids flowing through a conduit by forcing the flow to pass through a smaller cross-sectional area and correlating the drop in potential energy to the increase in kinetic energy resulting from increase of velocity due to the decrease in cross-sectional area. The energy correlation method of calculating flow rate is based on laws of physics of conservation of energy and conservation of mass, including the influences of meter orientation on potential energy and the expansibility effect of compressible fluids on kinetic energy at relatively high flow rates resulting in changes in flowing density at the locations of the pressure taps.

2. Description of the Related Art

The restricted flow area in a flowing conduit is routinely used to measure flow rate through pipes by developing a flow factor, generally referred to as the discharge coefficient, Cd, as a function the pipe Reynolds number, ReD, a non-dimensional parameter. The pipe Reynolds number is a function of the pipe diameter, the flow rate through the pipe, and the density and viscosity of the fluid at the flowing conditions. To establish the equation of discharge coefficient as a function of pipe Reynolds number, flowmeters are generally flow calibrated with fluids at multiple flow rates. Since the calibration fluid properties is often not the same as the fluid flow to be measured by the meter, the correlation of the Cd value to pipe Reynolds number for the operating conditions is established by flow calibrating the meter. As Reynolds number is function of the flow rate, while discharge coefficient defines the flow rate, the flow rate calculation is a circular mathematical logic that requires an iterative process to achieve acceptable flow rate value to a defined convergence criterion, which further contributes to measurement uncertainty in addition to the uncertainty contributions from the precision of instruments monitoring different operating parameter required to calculate the flow rate.

For many flowing fluids, especially the pipeline natural gas flows being mixture of different gases, the density of the gas at the operating pressure and temperature is calculated for the mole-fractions of the gas components, obtained by analyzing the representative samples of the flowing gas collected at a time interval as defined by the regulatory agency or the terms of the contract. Unless the actual viscosity of the flowing fluid can be determined or calculated for the operating flowing conditions, the value of the Reynolds number is calculated by assuming a fixed value of the fluid viscosity for all flowing conditions. This further contributes additional measurement uncertainty to the calculated value of the flow rate by flowmeters employing experimentally derived pipe Reynolds number and discharge coefficient correlation.

Using conventional techniques, every flowmeter typically needs to be individually flow-calibrated before it is installed in service. Where there are adequate calibration database for a flowmeter design and line size, there may be class certification for the Cd vs ReD equation, as in case of orifice flowmeters. Unfortunately, flow rate calculation of differential pressure type flowmeters, typically requires a dedicated flow computer for using a complex algorithm, when discharge coefficient is defined as a function of the pipe Reynolds number, because an acceptable value of the pipe Reynolds number must be calculated through an iterative method for the predefined convergence criterion.

SUMMARY OF THE INVENTION

The invention provides methods for calibrating flowmeters using an energy correlation method of calculation in which the change in potential energy is correlated to the change in kinetic energy for the flow. In accordance with the inventive methods, a primary element is installed with a restriction bore in the flow conduit. The primary element might be a torus flowmeter of a type known in the art. The high pressure of the differential pressure type flowmeter is preferably measured at the pipe wall within the flow bore of the pipe, upstream of the primary element. The low pressure is preferably measured by a second pressure tap at a location within the flow bore which is downstream of the high pressure measurement tap and at the most restricted area of the primary element (center tap) or at a location on the pipe downstream of the primary element. When the low pressure tap is located downstream of the restriction bore, values of discharge coefficient as a function of the Reynolds number differ from that for the center tap, due to some recovery of pressure as flow area at the downstream low pressure tap expands, allowing the flow velocity to decrease, thereby converting some amount of the kinetic energy to potential energy. This pressure recovery at the pressure tap downstream of the restriction bore is function of the dimension and design of the primary element. In certain preferred embodiments, the downstream pressure tap is located either at the pipe wall, immediate or further downstream of the primary element.

The described methods of calculating flow rate, using energy correlation method for the monitored differential pressure readings between the upstream and downstream pressure taps provide an advantage over traditional flow rate calculation techniques using Reynolds number versus the discharge coefficient method. In exemplary embodiments, for example, the low pressure measurement tap is placed at the restriction bore of the primary element (center tap) or at a location on the pipe, downstream of the primary element. An experimental study of orifice flowmeters demonstrated that the total recovery of the downstream pressure occurs around 2.5D to 4.5D downstream of the primary element, where D is the inside diameter of the pipe. The experimental study published in the public domain, demonstrated that the flow profile reattachment point depends on the ratio of the bore diameter to the pipe diameter. Hence, placement of a temperature or sampling probe within 4.5D downstream of the primary element is not permitted by the current applicable standards, as flow disturbances caused by the presence of a probe or a transmitter before reattachment of the flow profile may affect the pressure measured at the downstream pressure port of the flowmeter. Close placement of the downstream sampling probe to the primary element is desirable in instances where suspended solids or condensed liquid in the form of mists is present in the flowing fluid. Since, the kinetic energy at the most restricted area of the primary element is function of the density and velocity through the bore, experimental investigation demonstrated that proximity of a probe one-half pipe diameter (0.5D) downstream of the primary element has no discernible influence on the flow velocity passing through the restriction bore.

A differential pressure type flowmeter is flow calibrated by fluids flowing at different flow rates in volume or mass units of gallons, liters, cubic-feet, cubic-meters, kilograms, tons, pounds, barrels, acre-feet, etc. Measured differential pressures are preferably provided to a flow computer which calculates the volume or mass flow rate for the flowing fluid at different differential pressures. In some instances, the flowmeter is calibrated using two or more different fluids, such as air, natural gas, and water.

Once calibrated, the performance of hydrodynamically identical flowmeters can be statistically expressed within a specified limit of uncertainty. The differential pressure-type flowmeters can calculate the flow rate by correlating the monitored differential pressure to the change of potential energy to the change of kinetic energy. This approach of correlating changes in kinetic and potential energies to the measured differential pressure at two locations in the pipe, eliminates adverse influence of fluid viscosity dependent value of the Reynolds number on discharge coefficient. As the energy correlation method of calculating flow rate does not require the value of the fluid viscosity, flow rate calculated by using energy correlation method achieves lower measurement uncertainty compared to the flow rate calculation procedure using traditional discharge coefficient as a function of Reynolds number. At most metering stations, flow rate measurement of natural gas by a differential pressure type device, a fixed value of gas viscosity is assumed to calculate the pipe Reynolds number, irrespective of the gas composition or the operating pressure and temperature. This contributes additional measurement uncertainty to existing uncertainty of the experimentally derived Reynolds number versus discharge coefficient equation.

The energy correlation method of calculating flow rate also eliminates the complex iterative method of determining the value of discharge coefficient. Therefore, for most fluid flows with known or calculated fluid density at flowing conditions, need for a dedicated flow computer can be eliminated. Experimental study of the primary element monitoring low pressure at the center tap demonstrated most stable differential pressure, compared to low pressure tap located downstream of the primary element. Since the flow profile downstream of the orifice plate undergoes sudden expansion and requires about 2-1/2D or more downstream distance for the flow to fully reattach to the wall of the pipe, the downstream pressure tap of a differential pressure type flowmeter has significantly high fluctuations of differential pressure readings, compared to the differential pressure readings at the center tap. Experimental study further demonstrated that the differential pressure measured between the upstream pipe tap and the center tap has negligible influence from a probe inserted to the center of the pipe at 0.5D downstream of the primary element.

When a differential pressure type flowmeter is flow calibrated with multiple fluids, the current practice is to establish the correlation of the discharge coefficient of the flowmeter to the calibrated Reynolds number range. Since the energy correlation method of calculating flow rate is independent of the fluid viscosity and is function of the flowing density only, the correlation of the best fit line of the calibration data of the flowmeter retains the same slope for calibration data sets for different calibration fluids.

The invention also provides for an improved flowmeter design which is calibrated using energy correlation calculations as described previously. An exemplary inventive flowmeter would include first and second pressure taps which are configured to detect fluid pressure and provide a signal indicative of detected pressure to a flow computer. The inventive flow meter would also include a flow computer having programming which determines a volume flow rate or mass flow rate from the detected pressures using an energy correlation calculation that equates the change in potential energy for the flowing fluid to change in kinetic energy of the flowing fluid, between two pressure tap locations.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the figures of the drawings and wherein.

DETAILED DESCRIPTION OF THE PREFERRED EMBODIMENTS

Figure 1:
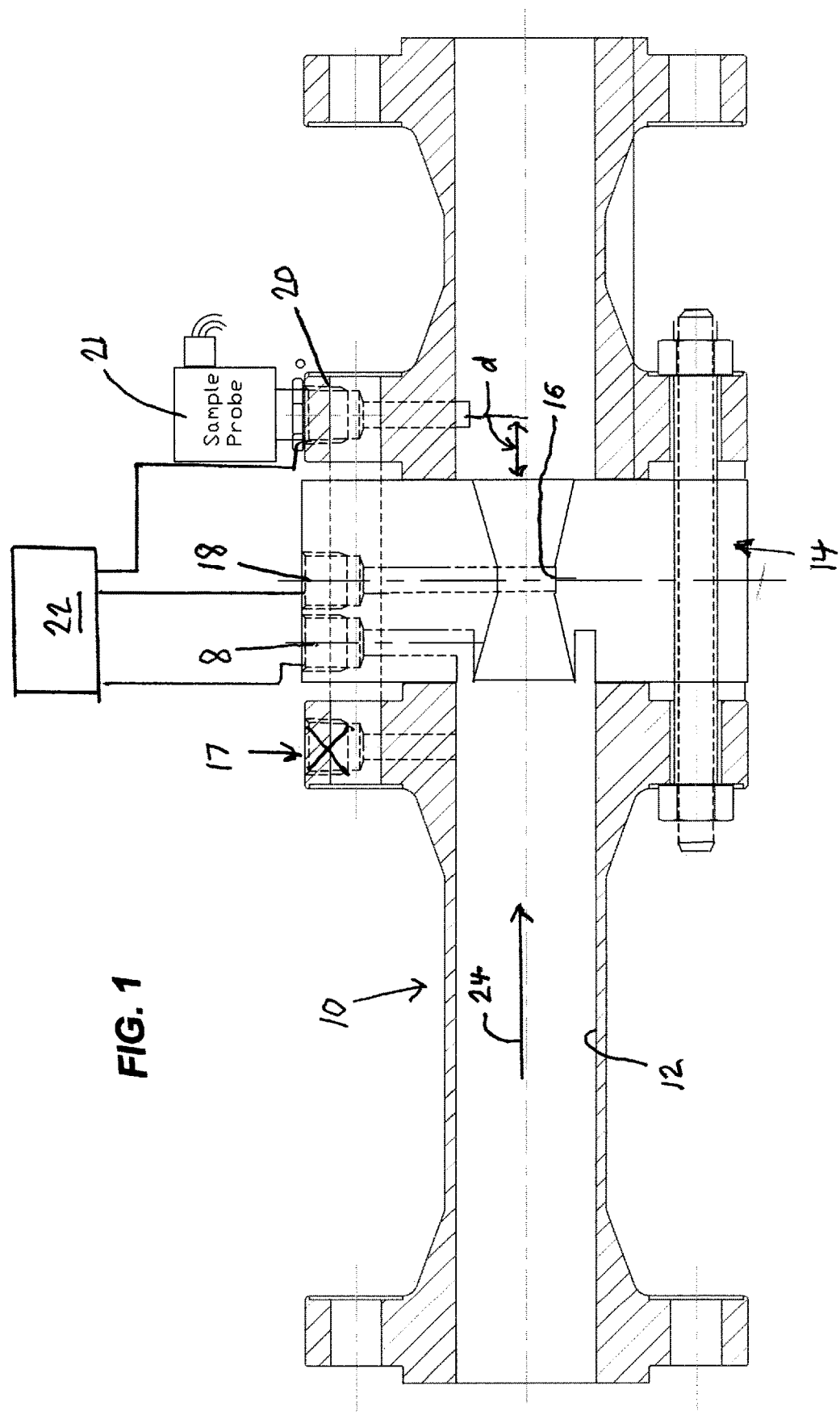
FIG. 1 is a side, cross-sectional view of an exemplary pipeline with a flow measurement system.

FIG. 1 illustrates an exemplary pipeline 10, which defines a flow bore 12 through which a fluid (not shown) is flowed. A restriction bore or primary element 14 is located within the flow bore 12 having a flow restriction bore 16. Fluid flowing through the flow bore 12 must pass through the bore 16. The primary element 14 may be of any type well-known in the art or may be of those described in U.S. Pat. No. 7,357,040 ("Torus Wedge Flow Meter"), U.S. Pat. No. 10,444,044 ("Flow Measurement Systems and Methods") or U.S. Pat. No. 10,054,472 ("Fluid Flow Meter"). Each of these patents are owned by the applicant and are herein incorporated by reference in their entirety.

A flow measurement system is associated with the pipeline 10 and includes an upstream high pressure tap 8 and a low pressure tap 18 (center tap) at the most constricted area 16, of the primary element 14, or downstream pipe tap 20 that can each detect pressure within the flowbore 12 as is known in the art. There may be other pressure taps, such as tap 17, which is currently blocked. The differential pressures between the upstream pressure tap 8 and two low pressure taps 18 and 20 are each operably associated with a flow computer 22 of a type known in the art for receiving flow measurements and performing calculations in accordance with programmed instructions. The high pressure tap 8 is located at the pipe upstream of the primary element 14 while the low pressure taps 18 and 20, downstream of the upstream pressure tap 8. A sample probe 21 is inserted into the flow bore 12 downstream of the primary element 14. It is noted that the sample probe 21 is located at a distance ("d") downstream of the primary element that is less than or equal to 2.5D. Most preferably, the sample probe 21 is inserted at a distance "d" that is about 0.5D from the primary element 14.

During operation, fluid flows through the flow bore 12 and the primary element 14 in the direction of arrow 24. As fluid flows through the pipe, fluid pressure is detected by the upstream tap 8 and either of the two low pressure taps 18 or 20 or by both. Detected differential pressures are then provided to the flow computer 22. The flow computer or electronic calculator can thereby calculate the flow rate by simply knowing the density of the fluid at flowing conditions and the monitored differential pressure for the known meter performance characterization in the energy correlation format. The flow computer 22 is provided with programmable logic, which will perform an energy correlation calculation in which the change in potential energy is correlated with the change in kinetic energy for the flow, to calculate the mass or volume flow rates. To calibrate the flowmeter, fluid flow rates are changed to monitor differential pressures at multiple flow rates. These measured flow rates as a function of energy correlation factors that include differential pressure and density of the flowing fluid at the time of calibration are plotted with best-fit linear regression line.

Figure 2:
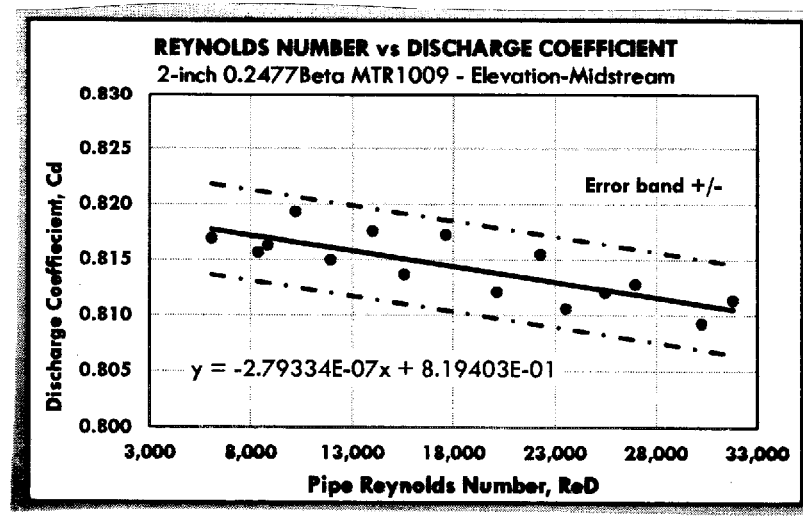
FIG. 2 is a plot of calibration data set of a 2-inch 0.2477-Beta center tap Torus meter in traditional pipe Reynolds number versus discharge coefficient characterization of the meter performance. Beta is the ratio of the bore diameter to the pipe diameter.
Figure 3:
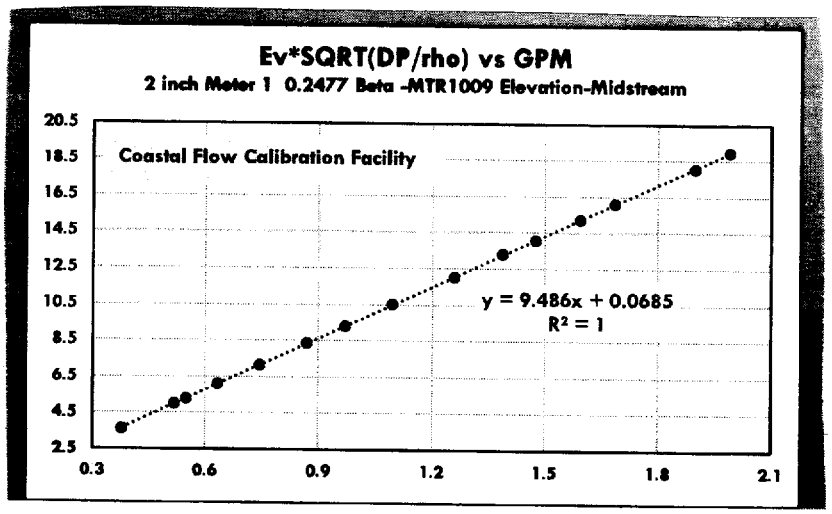
FIG. 3 is a plot of same set of calibration data of the meter in FIG. 2, where the characterization of the meter performance is by the energy correlation method.

FIG. 2 illustrates calibration for a 2-inch pipeline using traditional measurement technique, which plots Reynolds number against discharge coefficient. As observed, there is a significant+/−error band encompassing the calibration data set. FIG. 3 illustrates the same calibration data set of the 2-inch meter of FIG. 2 when plotted in the energy correlation format, data has significant reduction in measurement uncertainty for the calculated flow rate. Notable is the lack of an error band surrounding the plotted data which form a very linear and straight regression line, even within the known measurement uncertainties of the calibration facility.

Figure 4:
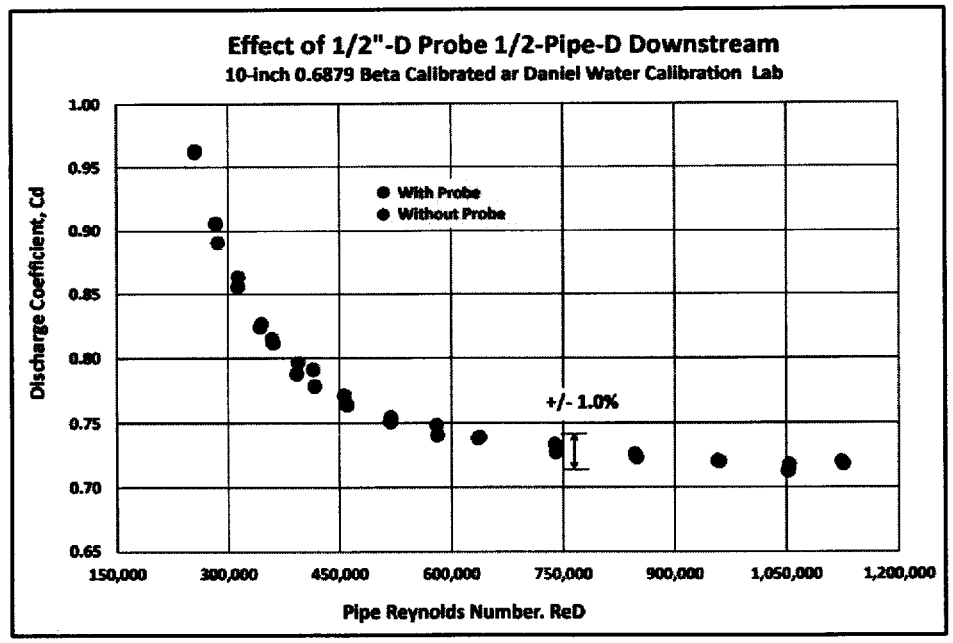
FIG. 4 is a plot of calibration data of a 10-inch Center Tap Torus meter with and without a 0.5-inch diameter probe, inserted to the center of the pipe at 0.5D downstream of the primary element, where meter performance is characterized in traditional pipe Reynolds number versus discharge coefficient.
Figure 5:
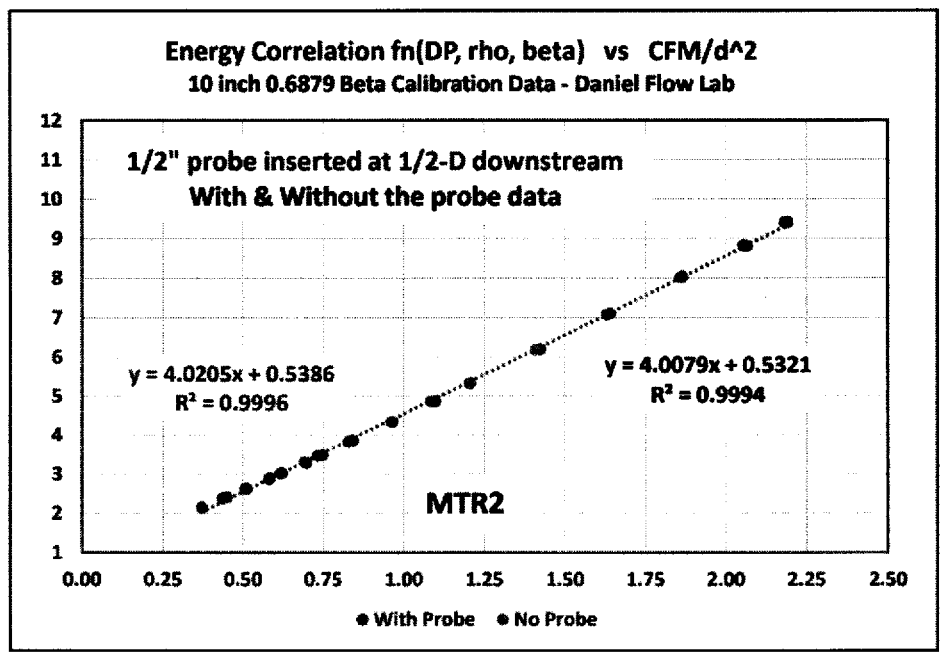
FIG. 5 is the plot of same calibration data of the 10-inch meter of FIG. 4, where performance characterization of the meter is by the energy correlation method.

FIG. 4 displays the traditional plot of calibration data of the 10-inch meter with and without an inserted probe in the proximity of the primary element indicating negligible influence on the measured flow rate. The meter performance characterization in traditional pipe Reynolds number versus discharge coefficient plot shows a strong dependence of discharge coefficient on pipe Reynolds number. FIG. 5 illustrates that same calibration data set of the 10-inch meter of FIG. 4, plotted in the energy correlation format has significant reduction in uncertainty of the meter performance and data sets of with and without the probe in the flow, only 0.5D downstream of the primary element, are nearly identical within the uncertainty of the calibration facility.

Figure 6:
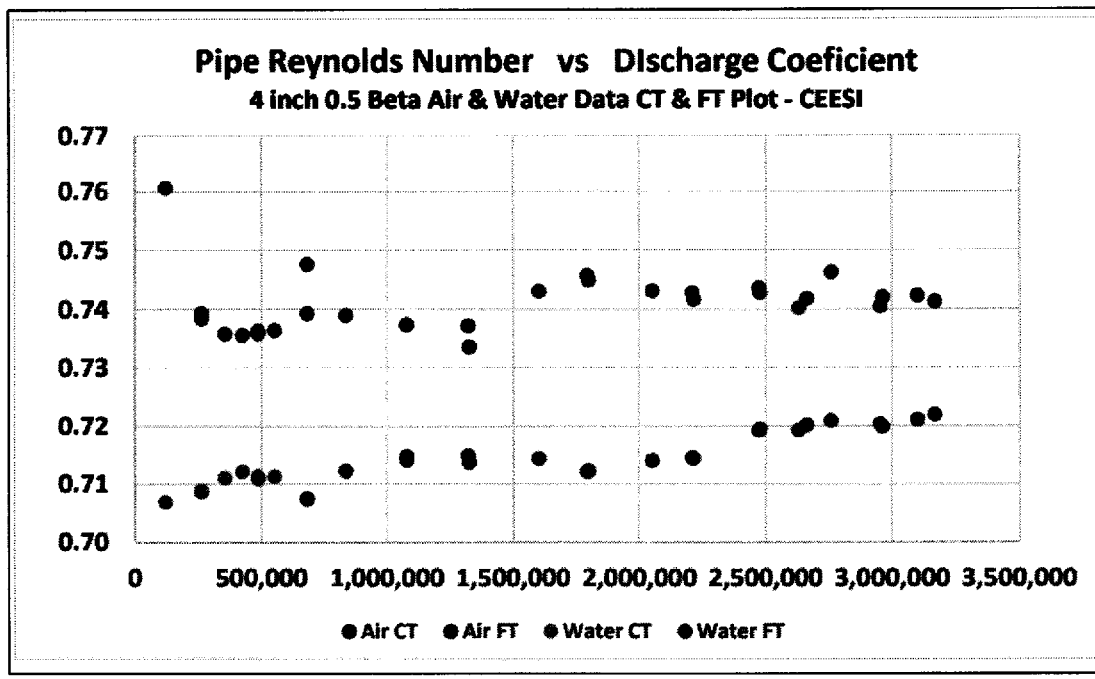
FIG. 6 is a plot of calibration data of a 4-inch 0.5 beta Torus meter where differential pressures was monitored between the upstream high pressure tap and both the low pressure taps (a) the center tap and (b) downstream flange tap. Flowmeter was calibrated with air and water and the flowmeter performance characterization is in traditional Reynolds number versus discharge coefficient format.

FIG. 6 is the plot in the traditional Reynolds number versus discharge coefficient format of calibration data sets of a 4-inch meter calibrated with two different calibration fluids, where differential pressures were monitored between the high pressure upstream tap and the two low pressure taps. The scatter in discharge coefficient values for calibration data sets of both fluids and for both center tap and flange tap is noticeable.

Figure 7:
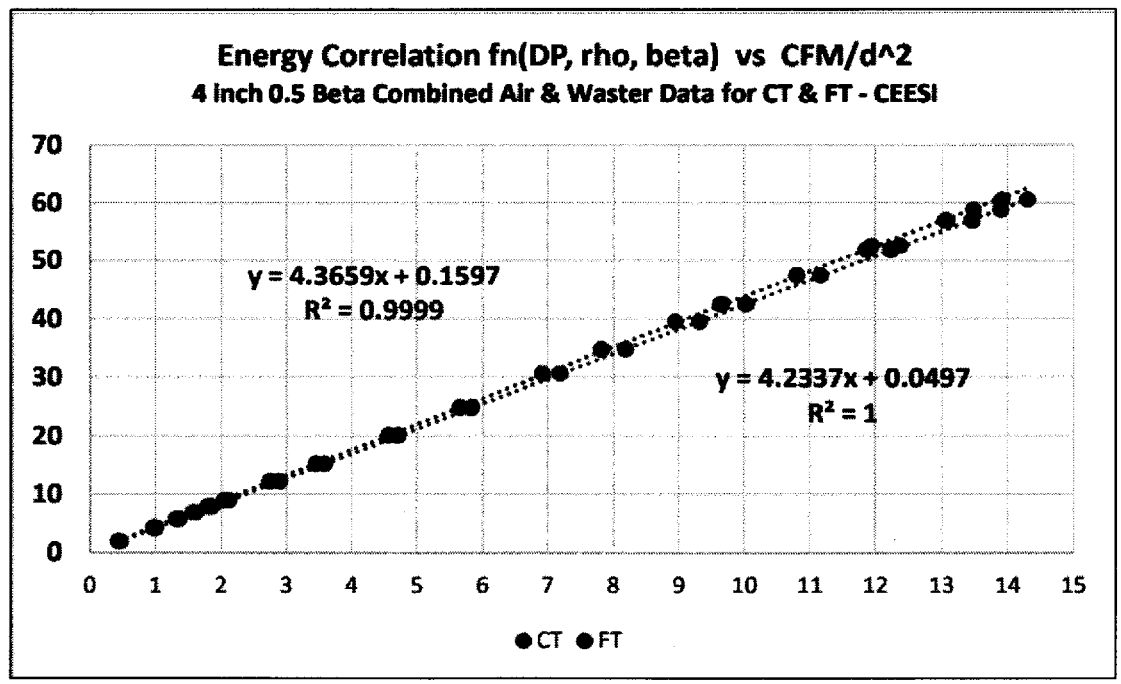
FIG. 7 is the plot of same calibration data sets of FIG. 6, where both water and air data are combined for the center tap and flange tap, and the flowmeter performance characterization is in energy correlation format.

FIG. 7 is the plot of the same calibration data sets of FIG. 6, where both water and air data are combined to illustrate that in the energy correlation method of characterization of meter performance within the measurement uncertainty of calibration facility, the slope of the regression lines of the water and air data are identical, within the limits of the measurement uncertainties of two different flow labs and two different calibration facilities. In addition, the characterization of the meter performance for the differential pressures at the center tap and flange tap have well-defined slopes.

It is noted that the ratio of slopes of the two different low pressure taps is constant at any flow rate, within the uncertainty of the calibration system and instrumentation. When a deviation in flow rates calculated by using the energy correlation method for differential pressures monitored at the two low pressure taps is beyond the allowable measurement uncertainty, that would serve as an indicator of measurement anomaly for the flowmeter system. Hence, indication of system malfunction can be programmed to alarm the operator to investigate the cause of the error, if the alarm condition persists.

The energy correlation method is extension of energy balance, where a change in potential energy for a flow is balanced against the change in kinetic energy. For ideal flows, change in potential energy ($\Delta$P.E.) is equal to the change in kinetic energy ($\Delta$K.E.). Hence, for operating conditions of non-ideal flows, when flow induced losses are minimized between the upstream and the downstream pressure taps, the change in potential energy will achieve a higher level of correlation with the change in kinetic energy.

For a steady-state ideal fluid flow through a pipe, the energy balance between two points of the pipe, 1 and 2, is stated by Bernoulli's equation as, $$\frac{P_1}{w_1} + \frac{1}{2}\frac{V_1^2}{g} + Z_1 = \frac{P_2}{w_2} + \frac{1}{2}\frac{V_2^2}{g} + Z_2,$$

Where, P is the static pressure;
V is the average velocity through the flow cross-section;
w is the density of the fluid;
g is the local acceleration due to gravity; and
Z is the elevation of the pipe cross-section from a reference datum.

For a horizontally installed flowmeter, the terms $Z_1$ and $Z_2$ are the same. For non-horizontally installed flowmeter, the differential pressure readings at the two pressure taps must be adjusted for the difference in the elevations between the two points. The differential pressure readings must be adjusted for difference in elevation between the high and low pressure taps and the density of the fluid at the flowing conditions, when the difference in elevation between the two differential pressure ports can affect the calculated flow rate value beyond the acceptable limits of measurement uncertainty.

Terms of the Bernoulli's equation are rearranged to derive the energy correlation function, $$\left(P_1 - \frac{w_1}{w_2}P_2\right) + w_1(Z_1 - Z_2) = \frac{1}{2}\frac{w_1}{g}(V_2^2 - V_1^2)$$

The Equation of Continuity for steady state flows is, $A_1V_1=A_2V_2$, where A is the cross-sectional flow area. Hence, $$V_1 = \frac{A_2}{A_1}V_2 = \frac{D_{bore}^2}{D_{pipe}^2} = \beta^2 V_2,$$

where $\beta$ is $$\frac{D_{bore}}{D_{pipe}}$$

and D is the diameter of the open area. Applying the equation of continuity to the Bernoulli's equation, $$\left(P_1 - \frac{w_1}{w_2}P_2\right) + w_1(Z_1 - Z_2) = \frac{1}{2}\frac{w_1}{g}(V_2^2 - \beta^2 V_2^2)$$

For Ideal fluids, term $w_1/w_2$, is equal to unity (1), and the velocity $$\frac{Q_v}{D_{bore}^2} = V_2 \propto \sqrt{\frac{1}{1-\beta^4} \cdot \frac{1}{w_1}[(P_1 - P_2) + (Z_1 - Z_2)]},$$

where $Q_v$ is the volume flow rate for the flowing conditions. Since discharge coefficient is defined as, $$C_d = \frac{\text{Actual Flow rate}}{\text{Ideal flow rate}},$$

for a specific design of differential pressure type flowmeter, the value of the discharge coefficient is established through experimental calibrations. When there are adequate calibration data, applying hydrodynamic similarity for a specific design of flowmeter and accounting for influence of fluid properties (density and viscosity) of real fluid through the pipe Reynolds number, an industry accepted generic discharge coefficient versus Reynolds number relationship is often established.

For real fluid flows, the discharge coefficient $C_d$ is combination of two terms; Coefficient of Contraction, $C_c$ and Coefficient of Velocity, $C_v$. The coefficient of contraction, $C_c$, relates to the change in pressure to the change in velocity, while coefficient of velocity, $C_v$, relates to the changes in velocity due to frictional loss, viscous loss, and losses due to changes in flow profile and effect of the mechanical design and dimensions of the primary element that changes the cross-sectional area of the flow. For all designs of primary element of flowmeters, the contraction of flow area causes a drop in potential energy (pressure) to increase kinetic energy (velocity). As energy cannot be destroyed nor created, total energy must remain unchanged at any cross-section of the flow conduit.

Analysis of calibration data demonstrates that the contribution of the coefficient of contraction to the discharge coefficient is orders of magnitude higher than contributions of the coefficient of velocity, especially when the primary element of the flowmeter results in measurable drop in pressure between the upstream high pressure tap and the low pressure tap at or downstream of the primary element. Hence, for differential pressure type flowmeters with high contribution from the coefficient of contraction to the discharge coefficient, relative to the contribution from the coefficient of velocity, correlating the calibration data to the energy balance eliminate the need to correct for minor influences of viscosity on the discharge coefficient for the flowmeter.

For incompressible fluids, the densities of the fluid at two closely located upstream-downstream pressure taps is essentially the same. Hence, the numerical value of the term $w_1/w_2$, can be assumed as 1 (unity) for incompressible fluid flows. For compressible fluid flows, if the differential pressure between the two pressure taps is orders of magnitude smaller than the pressure at the high pressure tap, then $w_1$ and $w_2$ can be assumed to be nearly the same. Additional experimental study to observe the effect of the term, $w_1/w_2$, for compressible fluids demonstrated that when the differential pressure readings at the two pressure taps are either equal or less than two orders of magnitudes smaller than the line pressure at the high pressure tap, influence of the term, $w_1/w_2$ on the calculated flow rate value is less than or equal to the value of the measurement uncertainty of the calibration facilities. Hence, for compressible fluids, when the differential pressure between the high-pressure and low-pressure taps is greater than 1% of the line pressure at the high pressure tap, then the influence of $w_1/w_2$ on the energy equation should be accounted for to achieve correct flow rate values.

Re-arranging the energy equation for which potential energy change of non-horizontally installed flowmeter is accounted for and the density difference between the high and low pressure taps has negligible effect on the flow rate equation, the energy equation of Section [0030] reduces to the form, $$\Delta P = \frac{w_1}{2g}(1-\beta^4)V_2^2,$$

where $\Delta P$ is the differential pressure reading between the high and low pressure taps. Therefore, $$V_2 = \sqrt{\frac{2g}{1-\beta^4} \cdot \frac{\Delta P}{w_1}}$$

$$\frac{4}{\pi}\frac{Q_v}{d^2} = \sqrt{\frac{1}{1-\beta^4}\frac{2g \cdot \Delta P}{w_1}},$$

where $Q_v$ is the volume flow rate through the pipe and d is the bore diameter.

Hence, above equation can be expressed as, $$\frac{Q_v}{d^2} \propto E_v \sqrt{\frac{\Delta P}{w_1}},$$

where $E_v$ is $$\sqrt{\frac{1}{1-\beta^4}},$$

which is also known as velocity of approach factor. Since the equation is stated as a proportional function, the relationship holds for any dimensional unit, as conversion of all variables in any other units are simple multiplication by numerical constants. Therefore, once the slope of the energy correlation plot is established in one set of units, it can be converted to any other units, with changes to the values of the slope and intercept of the linear fit line. Data from the field and calibration flow facilities display linear relationship of the energy relation function to the flow velocity and demonstrate that flow rates calculated by employing energy correlation method achieves more precise flow rate values with significantly lower measurement uncertainty than the traditional discharge coefficient method of calculating flow rate.

Additionally, the use of an energy correlation method to calculate the flow rate through the flowmeters could eliminate the necessity of a dedicated flow computer using a complex iterative algorithm for the determination of the pipe Reynolds number for the operating conditions. The flow rate in any dimensional unit (US Customary unit or SI unit) will be a simple multiplier of a linear relationship (a slope and an intercept) with the square root of the differential pressure and density of the flowing fluid at the operating conditions. There are commercially available differential pressure transducers that can output the square root of the monitored differential pressure, which then could directly display the flow rates of flowing fluid with known density at flowing conditions.

The best fit line of the calibration data sets in energy correlation format has a slope and an intercept. Ideally, with no energy loss between the high pressure tap and the low pressure tap, due to viscosity, pipe friction, or distortions of velocity profile, the intercept would be insignificant or nearly zero. Other contributor to the finite value of the intercept is due to uncertainty or precision of the calibration system and output of the instruments. All calibration data plots of center tap torus data illustrates that the value of the intercept is orders of magnitude smaller than the value of the slope of the regression line of the energy correlation plot. At relatively low differential pressures, the energy correlation method of calculating flow rate displays relatively low measurement uncertainty. Hence, the energy correlation method of calculating flow rate can offer greater rangeability than that is typically achieved by calculating flow rate using traditional method of Reynolds number versus discharge coefficient characterization of differential pressure type flowmeters when values are to be repeatable within a desired limits of measurement uncertainty.

In addition to the inventive methods of plotting the calibration data of a flowmeter, the present invention provides improved measurement of flow rates by flowmeters monitoring differential pressures and employing Reynolds number versus discharge coefficient method for calculating flow rates. An exemplary flowmeter, in accordance with the present invention, would include first and second pressure detection taps (8, 18, 20) as well as the flow computer 22 which is configured with programming allowing it to determine a volume or mass flow rate for fluid flowing through the flowbore 12 using an energy balance calculation and based upon the signals provided to the flow computer 22 by the taps 8, 18, 20.

When the sampling probe 21 is installed in proximity of the primary element and downstream pressure tap 20 is to provide alarm for the operator in the event of measurement anomaly, the flowmeter calibration must be performed with the sampling probe installed in the meter, to capture the influence of inserted probe 21 on the downstream pressure tap 20. The calibration fluid should match the compressible or incompressible fluid property of the actual fluid to be measured when the meter is installed in the field.

What is claimed is:

1. A method for calibrating a flow meter which is measuring the flow rate for a fluid flowing through a pipe, the method comprising the steps of:
   disposing a flow restriction within the pipe;
   flowing a fluid through the pipe and the flow restriction;
   detect fluid pressure of the fluid at a first location within the pipe which is upstream of the flow restriction;
   detect fluid pressure of the fluid at a second location within the pipe which is downstream of the first location, wherein the second location is downstream of the flow restriction and is within two inside pipe diameters ("2D") of the flow restriction;
   determine a first volume flow rate or first mass flow rate from the detected pressures, wherein the determination is done using an energy correlation calculation;
   change the rate of fluid flow through the pipe;
   determine a second volume flow rate or mass flow rate from the detected pressures, wherein this determination is done using an energy correlation calculation.

2. The method of claim 1 wherein the energy correlation calculation comprises equating a change in potential energy for the flowing fluid with a change in kinetic energy for the flowing fluid.

3. The method of claim 1 wherein the first location is a location which is upstream of the flow restriction.

4. The method of claim 1 wherein the second location is at the flow restriction.

5. The method of claim 1 further comprising the step of disposing a sample probe within the pipe at a distance that is 2.5D or less from the flow restriction.

6. The method of claim 1 wherein differential pressure between the first and second locations in measured, and a difference between a flow rate value calculated by the energy correlation method beyond an allowable deviation limit is set to alarm an operator for system error.

7. The method of claim 5 wherein the flow meter is calibrated with the sample probe installed in the pipe, to capture the influence of presence of the probe on the pressure reading on the pressure tap, downstream of the flow restriction.

8. The method of claim 1 wherein:
   the flow meter is calibrated with a fluid, and
   performance of the meter defined by slope and intercept of the calibration data for any dimensional unit is interchangeable to any other measurement units, without requiring recalibration of the flowmeter.

9. A flow meter for measuring flow of fluid through a pipe, the pipe having a flow bore with a flow restriction, the flow meter comprising:
   a flow computer configured to receive detected fluid flow pressure values and determine a volume flow rate or mass flow rate from the detected pressures using an energy correlation calculation;
   a pressure tap to detect fluid pressure of the fluid at a first location within the flow bore and provide a signal indicative of the detected pressure to the flow computer;
   a second pressure detection tap to detect fluid pressure of the fluid at a second location within the flow bore and provide a signal indicative of the detected pressure to the flow computer, wherein the second location is downstream of the flow restriction and is within two inside pipe diameters ("2D") of the flow restriction.

10. The flow meter of claim 9 wherein the energy correlation calculation comprises equating a change in potential energy for the flowing fluid with a change in kinetic energy for the flowing fluid.

11. The flow meter of claim 9 wherein the first location is a location which is upstream of the flow restriction.

12. The flow meter of claim 9, further comprising:
a third pressure detection tap to detect an additional flow rate value, the difference between detected flow rate values providing an option to initiate an alarm for the flow meter.

13. The flow meter of claim 9, further comprising:
a sample probe disposed within the pipe at a distance that is 2.5D or less from the flow restriction to provide reduced influence on flow velocity passing through the flow restriction in instances where suspended solids or condensed liquid in the form of mists is present in the flow of fluid.

\* \* \* \* \*